United States Patent [19]
Parsay et al.

[11] Patent Number: 5,694,232
[45] Date of Patent: Dec. 2, 1997

[54] FULL DUPLEX OPTICAL MODEM FOR BROADBAND ACCESS NETWORK

[75] Inventors: Behrooz Parsay, Pleasanton; Richard H. Chen, Fremont; Jeffrey P. Sheade, Newark, all of Calif.

[73] Assignee: Ericsson Raynet, Menlo Park, Calif.

[21] Appl. No.: 568,003

[22] Filed: Dec. 6, 1995

[51] Int. Cl.⁶ .................................................. H04B 10/24
[52] U.S. Cl. ..................... 359/113; 359/124; 359/125; 359/152; 375/222; 370/276
[58] Field of Search .......................... 359/113, 114, 359/133, 124, 135, 152, 125, 143; 370/24, 30, 276; 455/6.1, 82; 375/222; 348/6.12

[56] References Cited

U.S. PATENT DOCUMENTS

| | | | |
|---|---|---|---|
| 4,866,699 | 9/1989 | Brackett et al. | 370/3 |
| 5,119,223 | 6/1992 | Panzer | 359/114 |
| 5,144,637 | 9/1992 | Koch et al. | 359/113 |
| 5,262,883 | 11/1993 | Pidgeon | 359/125 |
| 5,311,344 | 5/1994 | Bohn et al. | 359/125 |
| 5,321,541 | 6/1994 | Cohen | 359/127 |
| 5,418,869 | 5/1995 | Seike et al. | 359/113 |
| 5,452,124 | 9/1995 | Baker | 359/341 |
| 5,487,063 | 1/1996 | Kakuma et al. | 370/56 |

FOREIGN PATENT DOCUMENTS 3506715  8/1986  Germany .................................. 359/113

*Primary Examiner*—Kinfe-Michael Negash
*Attorney, Agent, or Firm*—Lyon & Lyon LLP

[57] ABSTRACT

An optical modem link for full duplex transmission of multiple, independent RF carrier signals between network elements of a Broadband Access Network, includes a first optical modem, e.g., at a CATV headend broadcast facility, linked by a single optical fiber with a second optical modem, e.g., at a distributed hub location, to form an optical modem link. Each optical modem end of a respective link is equipped with an optical transmitter, which transmits light signal having a first wavelength, a receiver which receives a light signal having a second wavelength, and a wavelength division multiplexer which directs the outgoing light signal onto, and the incoming light signal off of, respectively, the fiber link. Simultaneous transmission of digital baseband signals and independent RF signals in each direction over the optical modem link is accomplished by first forming an aggregate digital data signal from the digital baseband data signals to be transmitted, modulating an RF carrier with the aggregate digital data signal, and modulating an optical signal with both the digitally modulated RF carrier signal and the independent RF signals, respectively, so that all communication signals are transmitted in the RF domain over the optical link.

14 Claims, 4 Drawing Sheets

FULL DUPLEX OPTICAL MODEM FOR BROADBAND ACCESS NETWORK

BACKGROUND OF THE INVENTION

1. Field of the Invention

The present invention pertains to the field of communication networks. More particularly, the present invention pertains to an optical modem link which provides full duplex transport of multiple RF signals over a single optical medium between, for example, a headend broadcast facility and one or more distributed hubs.

2. Prior Art Systems and Methods

In modern video broadcast networks, e.g., a cable television ("CATV") broadcast network, a broadcast communication signal is transmitted "downstream" from a headend broadcast facility to a community of subscribers over a broadcast distribution network. A broadcast distribution network may include different transmission facilities, e.g., optical and/or electrical, and may utilize differing transmission methodologies, e.g., analog RF and/or digital baseband. By way of example, an analog RF CATV broadcast signal may be transmitted optically from a headend facility to a series of distributed hub locations, each of which splits (and amplifies) the broadcast signal for further downstream optical transmission over a number of "branch" facilities to a series of remotely located "broadband optical network units" ("BONUs"). Each BONU serves subscribers of the CATV network for a defined local area, e.g., a residential neighborhood or office complex. At the BONU, the broadcast signal is converted from optical to electrical transmission and then delivered via an electrical carrier facility, such as a coaxial cable distribution network, to respective subscriber locations served by the BONU.

In addition to the one-way, downstream distribution of the video broadcast signal, a broadcast distribution network must also be able to transmit and receive, (i.e., in both the downstream and "upstream" directions), assorted types of system-level information, referred to generally herein as "network management" data, between various administrative and monitoring systems located at the headend facility, distributed hubs and BONUs, respectively. As used herein, "network management" data is intended to encompass, but not be limited to, information transmitted to and from the headend facility for the purpose of carrying out system level functions such as network operations, administration, maintenance and provisioning functions, sometimes referred to in the industry as "O,A,M & P" data.

For example, network management data of an "operations" nature includes timing signals sent downstream from the head end facility to hub and/or BONU locations to maintain network synchronization between the distributed network elements. By way of another example, network management data of an "administration" nature includes network configuration instructions, such as an "ON" or "OFF" instruction sent downstream from an administrative module at the headend facility to a particular optical laser or amplifier in the downstream network. By way of yet another example, network management information of a "maintenance" nature includes test signals comprising a series of bit patterns sent from a testing unit located in the headend facility to a circuit or component located elsewhere in the network, which are then "looped-back" upstream to the testing unit and examined for changes, if any, which may indicate that the circuit or component is faulty or malfunctioning. Yet another example of network management data includes alarm signals sent from a hub or BONU location to the headend facility indicating a problem, e.g., an equipment failure.

The foregoing examples are made to demonstrate but a few, non-limiting types of both upstream and downstream network management data, typically required to be sent between components of a video broadcast distribution network in order to ensure proper network operation and service integrity. In known CATV broadcast distribution networks, network management data is typically transmitted as a digital baseband signal over a digital interface, e.g., a RS-232, RS-485, Ethernet or parallel TTL interface, between the headend facility and various hub and/or BONU locations. The transmission link is typically provided by separate communication channels "outside" the broadcast distribution network. For example, network management data signals may be transmitted over a series of "point-to-point" transport links located between the headend facility and each respective distributed hub, and then over additional point-to-point links between a hub and the respective BONU locations it is connected to. The transport links often require a combination of modems and copper twisted wire pairs or coaxial cables and may be limited by both transmission bandwidth and distance limitations.

Commonly, an overlapping telecommunication network is used to provide the transmission facilities for network management data, e.g., over leased or "private" lines. For example, each hub and BONU location in a broadcast distribution network may be provided with several telecommunication network access ports, which provide a link for two-way transfer of digital baseband network management signals to and from the headend facility, respectively, i.e., between digital interface facilities at each location. A number of one-way upstream communication links are typically utilized for alarm channels, often including a separate "back-up" facility for each alarm channel. Because the volume of ongoing network management transmissions can be substantial, especially in larger CATV broadcast distribution networks which may serve tens of thousands of subscribers, a considerable number of telecommunication links may be required between a headend facility and each respective hub and BONU location, respectively, to ensure all network management messages are properly transmitted and received and that service integrity of the distribution network is maintained. These additional communication links can be quite costly and can be subject to undesirable distance and bandwidth limitations.

In addition to network management data, it is also desirable to transmit other types of communication signals—in both the upstream and downstream direction—within a CATV broadcast distribution network, which would greatly expand the types of services supported by the network and, therefor, enhance its value. It is presently anticipated that several new services will arise requiring both point-to-point and point-to-multipoint transmission of independent communication signals, including a full range of both digital baseband and analog or digitally modulated RF carrier signals. Such a network is referred to generally herein as a Broadband Access Network.

For example, one identified service requiring transport outside of the tradition broadcast distribution network includes the transmission of digital information between a network supervisory system at the headend facility and "set-top" control circuitry located at each subscriber's premises. As used herein, subscriber "set-top" circuitry refers generally to CATV control circuitry traditionally located in a box-like unit placed on top of a subscriber's television set—hence the "set-top" designation—although more recently the control circuitry is incorporated within the television set itself. Downstream set-top data may include, for example, an instruction sent from the CATV service provider to activate or deactivate the CATV service, or to authorize additional channel reception within the RF spectrum of the broadcast signal, respectively. Another example of downstream set-top data may include information "polling" to collect data on usage, e.g., for ratings or billing purposes.

Upstream data sent from the subscriber set-top circuitry to the service provider, sometimes referred to as "set-top telemetry" data, may include a response to downstream polling, as well as other types of information, such as, e.g., video-on-demand subscriber service requests. As with network management data, upstream set-top data is typically carried over an "outside" network on a digital baseband interface facility. For example, upstream set-top data may be transmitted on a dial-in basis by the subscriber, i.e., via a digital interface modem link over the subscriber's telephone line. Usage data may also be automatically provided over the subscriber's telephone line at scheduled intervals, e.g., during off-hours such as early morning, via an installed set-top modem.

Another identified service includes downstream, delivery of digitally encoded video signals, e.g., "compressed video." Known formats for compressed video include several Motion Picture Expert Group, ("MPEG") encoding formats. Yet another identified group of services requiring both upstream and downstream transmission of multiple, independent analog RF and/or digital data signals is "subscriber generated video" services. For example, subscriber generated video signals may comprise compressed modulated digital baseband or analog RF signals to be transmitted upstream from a subscriber location to a respective BONU, hub or headend facility. These RF signals may then be added to the downstream broadcast signal within an available RF channel spectrum for broadcast distribution. Of significant interest is the ability to offer point-to-point or point-to-multipoint transmission of subscriber generated video signals outside of the broadcast signal transmission on a cost effective basis.

Thus, given the wide variety of potential communication services to be provided over a CATV broadcast distribution network, it is desirable to provide both upstream and downstream communication paths, which do not require use of the broadcast signal transmission bandwidth or the use of expensive and limited digital baseband signalling over individual private communication links.

U.S. Pat. No. 5,311,344, issued to Bohn et al., discloses a bi-directional lightwave transmission system in which a plurality of digital baseband signals are time-division-multiplexed into a composite digital signal. The composite digital signal modulates a laser operating at a first wavelength for optical transmission of the signal from a headend facility, over a single transport fiber, to a plurality of respective individual subscriber terminals. Upstream digital data signals from an individual subscriber terminal are modulated onto an RF "subcarrier," i.e., at a frequency designated solely for the particular subscriber, which, in turn, modulates a laser operating at a second wavelength for optical transmission headend facility over the same transport fiber. For upstream transmission, light signals from the plurality of subscribers are combined onto the single fiber by the star coupler. At the head end facility, the combined upstream light signal is separated from the downstream light signal by a optical coupler and converted to an electrical signal. Each respective "subcarrier" frequency is then extracted by a corresponding band-pass filter and the respective subscriber signal is then demodulated back to a digital baseband signal.

While the Bohn et al. system provides duplex transmission of downstream and upstream signals between a headend facility and multiple subscriber terminals, respectively, several limitations to the system prevent its use as a full duplex transport link in a Broadband Access Network. For example, the input signals at both ends are strictly digital baseband, with no ability to support multiple, independent RF pass-through signals. Downstream transmission from the headend is limited to synchronous digital baseband signals, i.e., the transmitting laser is baseband digitally modulated. Therefore, no independent analog RF pass-through carrier signals can be accommodated. Upstream transmission requires an independently modulated subcarrier light signal from each subscriber terminal, wherein the headend facility can only receive the specific frequencies according to the selected RF bandwidth filters. Further, there is no disclosed method or capability in Bohn et al. to dynamically configure the digital baseband I/O ports. Moreover, the use of optical couplers to route the incoming and outgoing signals, respectively, at each end of the fiber link results in significant optical loss limitations on the link length.

Thus, it remains an objective of the present invention to provide a communication system which performs bi-directional transport of multiple digital baseband data signals, such as network management data, and at the same time providing transparent, bi-directional transport of multiple, independent RF signals over the same optical medium.

SUMMARY OF THE INVENTION

The present invention provides an optical modem link for full duplex transmission of multiple, independent RF carrier signals between elements of a Broadband Access Network. In a preferred embodiment, a first optical modem, e.g., at a CATV headend broadcast facility, is linked by a single optical fiber with a second optical modem, e.g., at a distributed hub location, to form an optical modem link. Both ends of the link are equipped with a optical transmitter which transmits an outgoing light signal having a first wavelength, an optical receiver which receives an incoming light signal having a second wavelength, and a wavelength division multiplexer which directs the outgoing light signal onto, and the incoming light signal off of, respectively, the fiber link.

In accordance with one aspect of the present invention, simultaneous transmission of digital baseband data signals and independent RF signals in each direction over the optical modem link is accomplished by first forming an aggregate digital data signal from the digital baseband data signals to be transmitted and modulating an RF carrier with the aggregate digital data signal. An outgoing optical signal is then modulated with both the digitally modulated RF carrier signal and the independent RF signals, respectively, so that all communication signals are transmitted in the RF domain over the optical link. A significant advantage of the present invention is that all RF input signals simultaneously modulate a single optical signal in each direction over the link. A further advantage of the present invention is that the actual message protocol of the various RF signals is not important since the optical modem link is transparent to the respective RF transmitting and receiving devices or interfaces.

By way of example, in a preferred embodiment employed in a CATV broadcast distribution network, a separate optical modem link is provided from a headend CATV broadcast facility to each of a plurality of distributed network hubs. Multiple digital baseband data signals originating from a plurality of digital interface ports at the headend facility, (e.g., from separate RS 232 or 485 ports carrying network management data), are combined to form a single, aggregate digital data signal, which is then encoded with a synchronous digital clock signal, e.g., by a manchester encoding scheme. The encoded digital signal is used to modulate an (electrical) RF carrier signal, which is then combined with one or more independent RF signals to directly modulate the transmitting laser of a respective headend optical modem for transmission to a destination hub over a respective optical modem link. In forming the aggregate digital data signal, time division multiplexing (TDM) or packet switching techniques are preferably used so that downstream separation of the data signals is easily handled by known digital data handling techniques. The aggregate digital data signal may preferably be formed with either synchronous or asynchronous digital data signals. Preferably, a wide spectrum of RF bandwidth is provided for use for one or more digitally modulated RF carrier signals, as well as any other RF signals, to be transported over the optical modem link.

When received at the respective hub optical modem, the incoming lightwave signal is directed by the receiving wavelength division multiplexer into a fiber receiver where the optical signal is converted back to the (electrical) multiple RF signals. The RF modulated encoded digital signal is filtered off from the rest of the RF signals and demodulated and decoded, respectively, back into an aggregate digital data signal. If the data was transmitted synchronously over the link, the digital clock signal is also preferably recovered from the encoded digital signal. The digital data is then separated back into multiple digital baseband data signals and routed to the appropriate digital interface ports at the respective hub end of the optical modem link.

In accordance with another aspect of the invention, the recovered digitally modulated RF carrier signal serves as a "pilot tone" for an automatic gain attenuation control circuit at the receiver. The remaining RF signals, such as, e.g., RF modulated MPEG encoded digital video, analog RF subscriber generated video, or RF modulated set-top information, respectively, are passed through the modem link directly to their routing destination, i.e., the link being "transparent" to the RF signals.

Thus, a general object of the present invention is to provide a cost effective, point-to-point, full duplex communication transport link between elements of a Broadband Access Network, such as a CATV broadcast distribution network. As will be apparent to those skilled in the art, other and further objects and advantages will appear hereinafter.

BRIEF DESCRIPTION OF THE DRAWINGS

It is to be understood that the accompanying drawings are provided for the purpose of illustration only, and are not intended as a definition of the limits of the invention. The drawings illustrate both the design and utility of preferred embodiments of the present invention, in which.

DETAILED DESCRIPTION OF THE PREFERRED EMBODIMENTS

Figure 1:
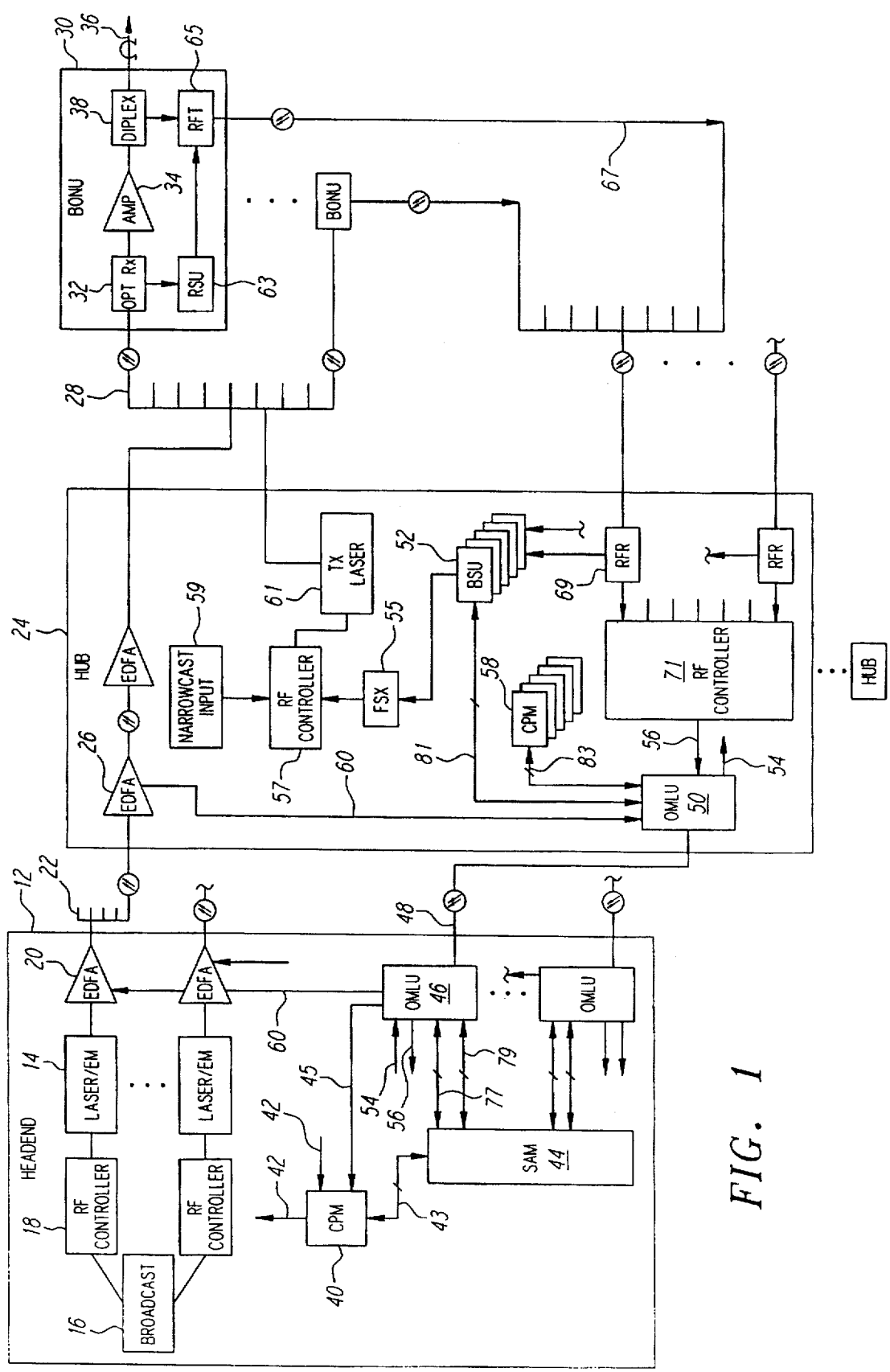
FIG. 1 is a block diagram of an exemplary CATV broadcast distribution network employing the present invention.

Referring to FIG. 1, a CATV broadcast distribution network includes a headend video broadcast facility 12, which utilizes one or more optical lasers 14 to transmit a broadband CATV RF broadcast signal. An analog RF broadcast signal is supplied by a broadcast feed 16 to a series of RF controller circuits 18. The frequency bandwidth of the broadcast signal may vary significantly depending on the particular selected broadcast channel plan, e.g., "77 channel NTSC" or "56 channel PAL," as well as the system bandwidth available for allocation. For example, in a preferred CATV broadcast distribution system employed by the assignee of the present invention, a video broadcast signal is transmitted within an RF spectrum bandwidth of approximately 45 MHz to 860 MHz. The respective RF controller circuits 18 feed the broadcast RF signal into the respective optical lasers 14, where it modulates an optical transport signal. The resulting optical signals are amplified, e.g., by an erbium-doped-fiber-amplifier ("EDFA") 20, and delivered over respective fiber distribution networks 22 to a plurality of respective distributed hub locations 24.

At each hub 24, the optical broadcast signal is amplified as necessary, e.g., by one or more EDFAs 26, and delivered over an optical branch network 28 to a plurality of broadband optical network units (BONUs) 30. At each BONU 30, the optical broadcast signal is converted to electrical RF transmission by an optical receiver circuit 32, amplified 34 and delivered over a plurality of coaxial distribution cables 36 for transmission to subscriber locations (not shown) which are served by the respective BONU 30. A diplexer circuit 38 is preferably used to insert the downstream electrical broadcast signal onto each coaxial distribution cable 36, so that upstream electrical RF signals, such as, e.g., analog RF subscriber generated video signals, or RF modulated set-top telemetry data signals, can be received by the BONU 30 over the same coaxial cable 36.

Operation of the headend facility 12 is overseen by a central processing module ("headend CPM") 40. The headend CPM 40 transmits and receives digital baseband network management data signals to and from, respectively, various headend network elements over a plurality of data buses 42. The CPM also performs as an interface between the headend network elements and a system administration module ("SAM") 44. The SAM 44, which controls the O,A,M&P functions for the CATV broadcast network, transmits and receives the headend network management data signals to and from, respectively, the headend CPM 40 over one or more data buses 43. In addition, the SAM 44 transmits and receives various digital baseband network management data signals to and from, respectively, remotely located supervisory units located at the distributed hub locations 24. In accordance with a general aspect of the present invention, transmission of the downstream and upstream digital baseband network management data is provided by a plurality of "duplex" (i.e., simultaneous, two-way) transport links, each comprising a headend optical modem 46 connected by an optical fiber 48 to a corresponding hub optical modem 50. In this manner, a point-to-point "optical modem link,"—"46/48/50"—is formed which not only transports the two-way, (i.e., upstream and downstream), digital network management data signals, but also simultaneously transports any number of independent RF signals, including other types of digital signals modulated on RF carriers, between the headend 12 and each respective hub 24 of the CATV broadcast network.

Figure 2:
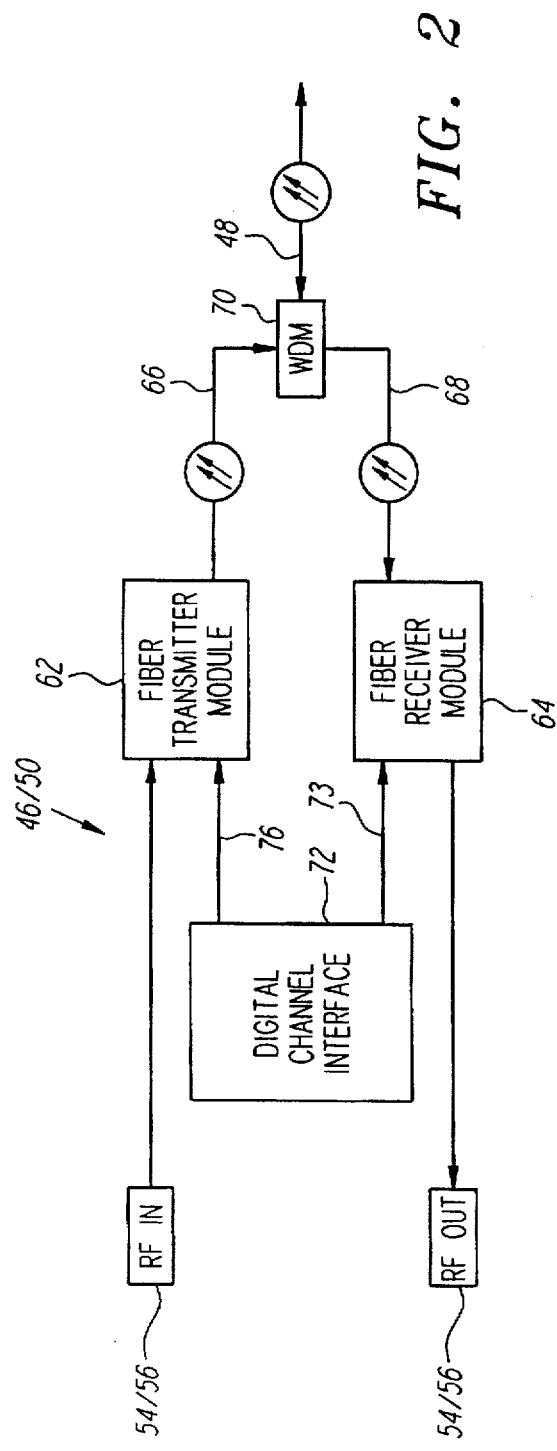
FIG. 2 is a block diagram of an exemplary optical modem in accordance with the present invention.

A more detailed description of the architecture and operation of the aforedescribed optical modem link 46/48/50 is as follows:

As seen in FIG. 2, each headend optical modem 46 and hub optical modem 50 are equipped with a fiber transmitter module ("FTM") 62, which transmits an outgoing RF modulated optical signal having a first optical wavelength, (described below in conjunction with FIG. 3), a fiber receiver module ("FRM") 64, which receives an incoming RF modulated optical signal having a second optical wavelength, (described below in conjunction with FIG. 4), and a digital channel interface circuit ("DCI") 72, which controls the transmission and reception of digital baseband network management data signals (described below in conjunction with FIG. 5), respectively.

From the perspective of a headend optical modem 46, a plurality of independent outgoing, (i.e., downstream), RF carrier signals 54 are input into the FTM 62 and a plurality of independent incoming, (i.e., upstream), RF carrier signals 56 are received from the FRM 64, respectively. Conversely, from the perspective of the respective hub optical modem 50, the plurality of independent downstream RF carrier signals 54 are received, (i.e., incoming), from the FRM 64 and the plurality upstream RF carrier signals 56 are input, (i.e., outgoing), into the FTM 62, respectively. The frequency bandwidth allocated for the RF carrier signals may vary significantly depending on the particular network applications and/or bandwidth available for allocation. For example, in a preferred CATV broadcast distribution system employed by the assignee of the present invention, an RF spectrum of approximately 5 MHz to 42 MHz is reserved for the independent RF signal transmission. The signalling protocol of RF signals 54 and 56 are advantageously transparent to the optical modem link 46/48/50.

At a transmitting end of the optical modem link 46/48/50, and in a manner described below in greater detail, the DCI 72 combines and encodes, respectively, multiple outgoing digital data signals to form a single encoded digital signal 76, which is fed into the FTM 62. At a receiving end, the DCI 72 receives an incoming encoded digital signal 73 from the FRM 64, which it then decodes and separates, respectively, into respective multiple incoming digital data signals.

Outgoing optical signals from the FTM 62 is transmitted over an optical feeder line 66 and into a wavelength division multiplexer (WDM) 70. The WDM 70 is configured to direct outgoing optical signals received from feeder line 66, (and having the first optical wavelength), onto the fiber link 48. The WDM 70 is also configured to direct incoming optical signals received from the fiber link 48, (having the second optical wavelength), onto a second optical feeder line 68, and into the FRM 64, respectively. In this manner, the WDM 70 provides a wavelength discrimination mechanism to direct the outgoing and incoming optical signals onto, and off of, respectively, the fiber link 48. Utilizing a WDM 70 to perform this function advantageously consumes significantly less optical signal power as compared to employing an optical coupler. This, in turn, allows for substantially greater fiber link 48 distances, i.e., with otherwise constant optical transmission power.

Figure 3:
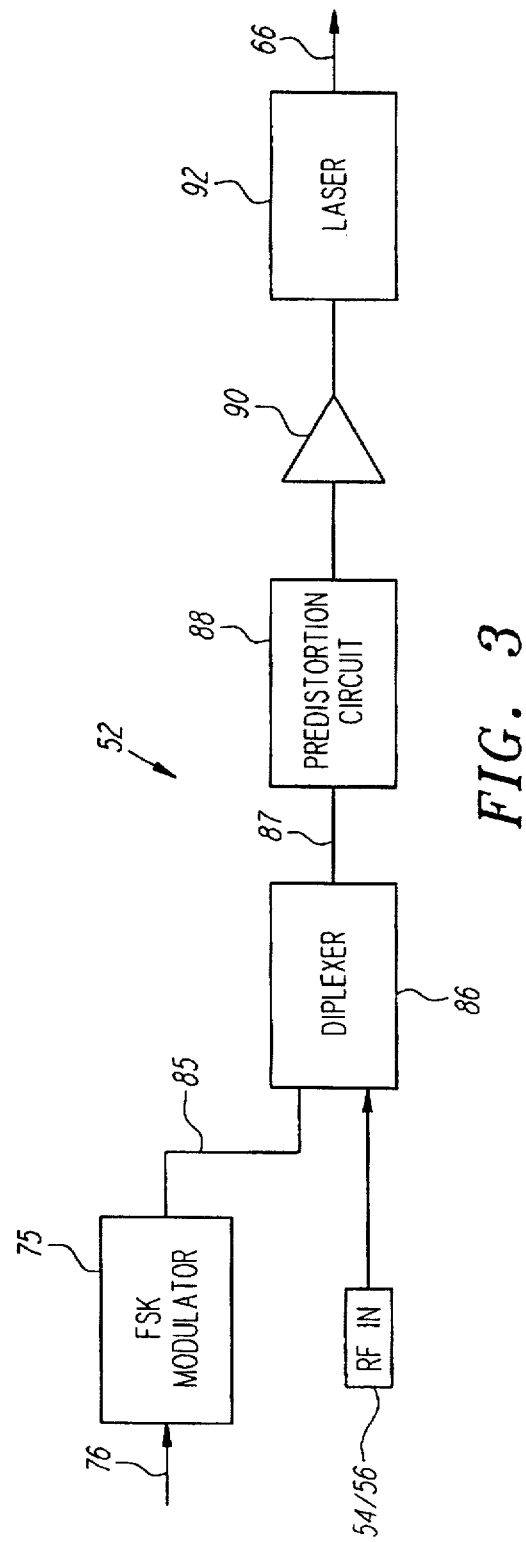
FIG. 3 is a block diagram of an optical transmitter module employed within the optical modem of FIG. 2.

The FTM 62 architecture is depicted in FIG. 3, wherein the outgoing encoded digital signal 76 is used to digitally modulate an RF carrier signal by an FSK modulation circuit 75, e.g., with an FSK modulation frequency of approximately 2.5 MHz (digital "zero") and 3.6 MHz (digital "one"), respectively. The resulting digitally modulated RF carrier signal 85 is then combined in a diplexer circuit 86 with the plurality of independent analog RF signals 54 or 56, respectively, to form a plurality of outgoing RF signals 87. The combined outgoing RF signals 87 are passed through a predistortion circuit 88 and amplified 90, respectively, preferably in a manner disclosed in U.S. Pat. No. 5,321,710, entitled "Predistortion Method And Apparatus For Laser Linearization," issued Jun. 14, 1994 to Cornish et al. and assigned to the assignees of the present invention, the disclosure of which is fully incorporated herein by reference. The combined outgoing RF signals 87 are then used to modulate an optical laser 92, resulting in an single, RF modulated optical signal, which is transmitted, via optical feeder line 66 and WDM 70, respectively, over the fiber link 48.

It is contemplated that optical lasers 92 utilized by the present invention may be selected which transmit any number of differing first and second respective wavelengths. In a preferred embodiment employed by the assignees of the present invention, the respective transmitting laser 92 of a headend optical modem 46 transmits a 1550 nm lightwave signal and the transmitting laser of a respective hub optical modem 50 transmits a 1310 nm lightwave signal, respectively. 1550 nm and 1310 nm lasers are preferable in that they are generally readily available in the marketplace and operate at desirable wavelengths for standard industry optical network equipment, e.g., fibers, amplifiers, etc. It should be readily apparent to one skilled in the art that the deployment of 1550 nm and 1310 nm lasers in this preferred embodiment could be reversed, i.e., with a 1310 nm transmitting laser 92 employed in the respective headend optical modems 46 and a 1550 nm transmitting laser 92 employed in the respective hub optical modems 50.

Figure 4:
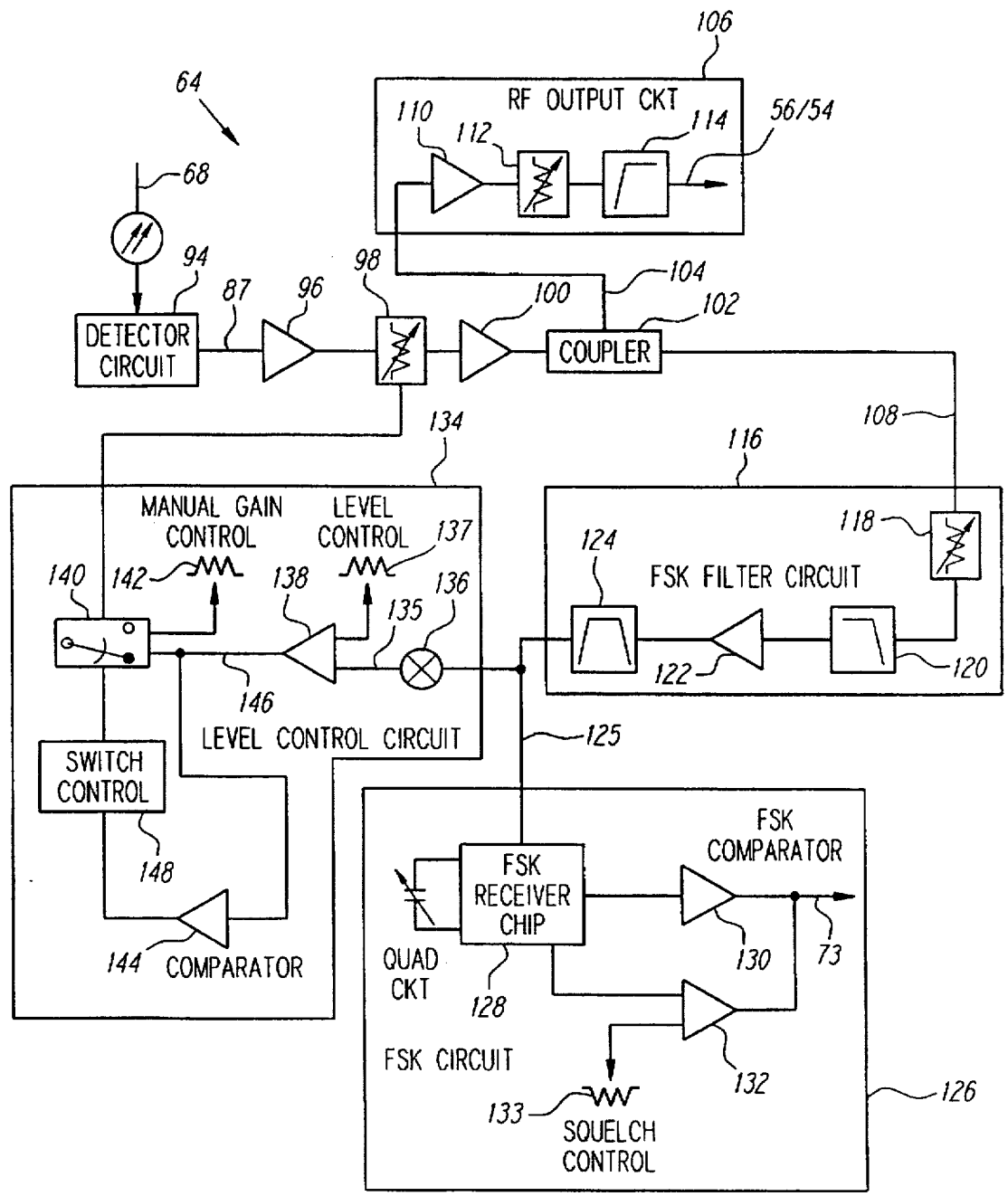
FIG. 4 is a block diagram of an optical receiver module employed within the optical modem of FIG. 2.

The FRM 64 architecture is depicted in FIG. 4, wherein the incoming optical signal, (i.e., having the respective "second optical wavelength"), is received from optical feeder line 68 and converted back to the combined RF signals 87 by a photo-optic detector circuit 94. The converted electrical RF signals 87 are initially amplified 96, attenuated by a variable level attentuator 98, such as, e.g., a voltage programmable (or "auto-gain") attenuator, and then again amplified 100, respectively. In this manner, the incoming RF signals 87 are maintained at a substantially constant or "nominal" power level. The RF signals 87 are then split by an RF coupler 102, with a first portion 104 of the combined RF signals 87 transmitted into an RF output/filter circuit 106 to recover the independent RF signals 56 or 54, respectively. A second portion 108 of the combined RF signals 87 is used to recover the encoded incoming digital signal 73. In the illustrated preferred embodiment, the second portion 108 of the combined RF signals 87 is also used as a "pilot tone" for a gain-level control circuit 134, which sets the attenuation level of the variable attenuator 98.

In the RF output/filter circuit 106, the RF signals 87 are again amplified 110, and attenuated 112, respectively, preferably to a preset power level. The signals are then passed through one or more high pass filters 114 to strip off the FSK modulated encoded digital signal 73, as well as to reduce any noise into the downstream circuitry. For example, in the aforementioned preferred CATV broadcast distribution system employed by the assignee of the present invention, a 5 MHz high pass filter is used to strip off the relatively low frequency FSK modulated encoded digital signal 73, as well as any low frequency noise that may be present in the signal. By the use of any number of selected further filtering combinations (not shown), the RF signals 56 or 54, respectively, may be completely separated, left combined, or some combination in between, depending on the particular destination and/or further routing required for each respective individual RF signal 56/54.

The second portion 108 of the incoming RF signals 87 is passed through an FSK filter circuit 116, which includes another attenuator 118, a 5 MHz low pass filter 120, an amplifier 122 and an FSK bandpass filter 124, respectively. The 5 MHz low pass filter strips the 5 MHz to 42 MHz independent RF signals 56/54 from the combined RF signals 87 prior to further amplification 122 of the signal, in order to isolate the FSK modulated digital signal 85 from the rest of the combined RF signals 87. The FSK bandpass filter 124 frequency filters the remaining RF bandwidth to the FSK frequency boundaries, i.e., between approximately 3.6 MHZ and approximately 2.5 MHz, in order to reduce noise in the downstream circuitry.

The resulting "FSK signal" 129 is then passed through an FSK demodulation circuit 126, which includes an adjustable receiver chip 128. The receiver chip 128 frequency demodulates signal 125, i.e., wherein the receiver chip 128 outputs a digital "one" when the frequency of the input signal is approximately 3.6 MHz and a digital "zero" when the frequency is of the input signal is approximately 2.5 MHz, respectively, thereby generating the "incoming" encoded digital signal 73. The (demodulated) encoded digital signal 73 is "cleaned up" by a comparator circuit 130, which preferably ensures that the respective digital ones and zeros will only be transmitted in response to actual respective data signal frequencies and not to noise frequencies. A second comparator 132 is used in conjunction with a squelch control circuit 133 to allow transmission of the encoded digital signal 73, i.e., to "break squelch," only when the voltage level of the input signal indicates that data, and not noise, is being transmitted.

The FSK signal 125 is also input into a (gain-feedback) level control circuit ("LCC") 134, wherein a mixer circuit 136 creates a DC voltage 135 directly proportional to the power level of signal 125. The DC voltage 135 is offset by a predetermined voltage level 137 and amplified, as necessary, by an op-amp circuit 138, resulting in a "feedback voltage" 146 directly proportional to the power level of the FSK signal 125. A switch 140 is provided in the LCC 134, which may be set in either "automatic" or "manual" gain position. When set in "automatic" gain position, the switch 140 connects the feedback voltage 146 to the variable attenuator 98, i.e., wherein the level of attenuation applied to the RF signals 87 is based on feedback voltage 146. In this manner, the attenuation level of the incoming RF signals 87 is "automatically" adjusted upward or downward, respectively, by the feedback voltage 146, so that the incoming power level of signals 87 is maintained at the desired nominal level.

The voltage 146 is also input into a comparator 144, which compares voltage 146 with a predetermined reference voltage (not shown), based on an expected minimum voltage level when the FSK signal 125 is present. In the event the FSK modulated RF signal 85 signal is not present, (i.e., when no transmission of the encoded digital signal 76 is taking place over the optical modem link 46/48/50), voltage 146 will drop below the predetermined reference voltage and the comparator 144 will direct a switch control circuit 148 to change the position of switch 140 to "manual" gain. In "manual" gain position, the switch 140 supplies a manual gain control voltage 142 to set the attenuation level of the variable attenuator 98. In this manner, the attenuation level of the incoming RF signals 87 is maintained constant until the FSK signal 125 is again received, wherein the comparator 144 directs the switch control 148 to return the position of switch 140 to "automatic" gain.

Figure 5:
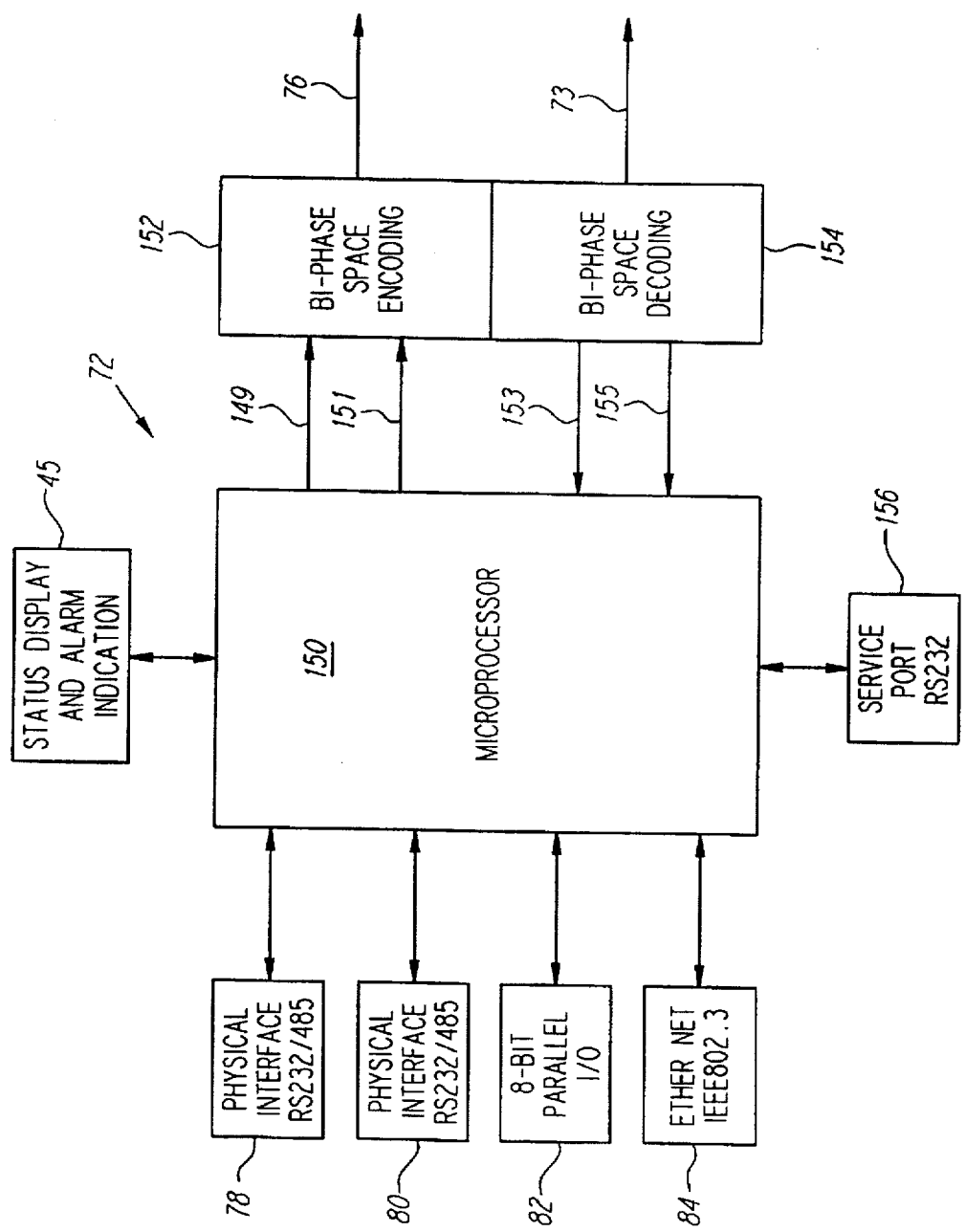
FIG. 5 is a block diagram of a digital channel interface circuit employed within the optical modem of FIG. 2.

Referring to FIG. 5, the DCI circuit 72 includes a microprocessor 150, which controls the transmission of multiple digital baseband data signals between a respective digital data interface ports locate at each end of the respective optical modem links 46/48/50.1 In the illustrated preferred embodiment, each DCI 72 is equipped with two RS 232 or 485 type synchronous digital data ports 78 and 80, an 8-bit parallel I/O port 82 and an IEEE 802.3 standard Ethernet port 84, respectively. In the transmit direction, the microprocessor 150 preferably employs time division multiplexing (TDM) or packet switching techniques to form a single, outgoing aggregate digital data signal 149 from the outbound digital data streams received from digital interface ports 78, 80, 82 and 84, respectively. The outgoing aggregate digital data signal 149 is encoded with a synchronous digital clock signal 151, e.g., by a bi-phase space (manchester) encoder 152, to form the outgoing encoded digital signal 76.

In the receive direction, the incoming encoded digital data signal 73 is decoded 154, e.g., by bi-phase space (manchester) decoding, into an incoming aggregate digital data signal 153 and a recovered digital clock signal 155, respectively. The receiving end microprocessor 150 separates the incoming aggregate digital signal into individual digital baseband data signals and transmits them to the appropriate respective ports 78, 80, 82 and 84, respectively, preferably synchronized by the recovered clock signal 155.

By employing well known digital data handling techniques, corresponding ports at both ends of an optical modem link 46/48/50 may be directly "linked" together by the respective microprocessors 150 at each end,—i.e., wherein the digital data is transmitted and received "transparently" between linked ports on each respective end. In particular, referring briefly to FIG. 1 along with FIG. 5, duplex digital baseband network management data signals are sent between the SAM 44 at the headend 12 and a plurality of broadband supervisory units ("BSUs") 52 at each respective hub location 24, via the respective interface port 78 at each end of each respective optical modem link 46/48/50. Duplex digital baseband network management data signals are also sent between the SAM 44 and a plurality of hub central processing modules ("hub CPMs") 58, via the respective interface port 80 at each end of each respective optical modem link 46/48/50. Data buses 77 and 79 transport the respective data signals between the SAM 44 and ports 78 and 80, respectively, of each headend optical modem 46. Likewise, data buses 81 and 83 transport the respective data signals between the BSUs 52 and hub CPMs 58, respectively, and the respective ports 78 and 80 of each hub optical modem 50. In the illustrated preferred embodiment, I/O port 82 is used to transmit laser safety shutdown ("LSS") signals 60 sent from a respective hub broadcast signal amplifier 26 to a respective headend broadcast signal amplifier 20 if a break in the broadcast fiber is detected between the headend 12 and respective hub 24. The ethernet port 84 may be used to link broadcast distribution network elements with a LAN server (not shown), e.g., in order to supplement, or replace, many of the functions of the SAM 44.

The microprocessor 150 is preferably provided with a service port 156 to allow for direct configuration of the DCI circuit configuration, including "time slot" allocation of data transmitted to and received from, respectively, the respective digital interface ports, as well as general "O,A,M&P" access to the microprocessor. It is contemplated that any number of variations in the quantity, type and application of digital interface ports can be accommodated by the DCI 72, the illustrated configuration being merely an exemplary preferred implementation. In a preferred embodiment, the microprocessor 150 may also serve as the main monitor and, where applicable, controller of the elements of the optical modem 46 or 50, respectively. For such purposes, a data bus 45 is preferably provided to provide network management data, e.g., such as alarm and status information relating to the operation of both ends of the optical modem link 46/48/50, from the respective headend microprocessor 150 to the headend CPM 40.

Returning to FIG. 1, further two-way communication of network management data and non-broadcast RF signals between the respective bud 24 and BONU 30 locations is accomplished as follows:

Downstream digital data transmitted from one or more BSUs 52 in a hub 24 is FSK modulated 55 and fed into an RF controller circuit 57. The RF controller circuit 55 feeds the FSK (RF) modulated signal, along with one or more "narrowcast" RF signals 59, into a respective transmitting optical laser 61, where the combined RF signals modulate an optical signal, which is combined with the broadcast optical signal for downstream transmission over the respective optical branch network 28. As used herein, a "narrowcast" signal 59 refers to a signal inserted into the CATV broadcast network at a point downstream of the headend facility 12, e.g., at hub 24 or BONU 30 location. Narrowcast transmission is generally disclosed and described in U.S. Pat. No. 5,457,562, entitled "Narrowcast Optical Communication Networks and Methods," issued Oct. 10, 1995 to Tremblay and assigned to the assignees of the present invention, the disclosure of which is fully incorporated herein by reference.

The source of such narrowcast signals may comprise, for example, one or more of the RF signals 54 transmitted from the headend 12 to a respective hub 24, via an optical modem link 46/48/50. Narrowcast signals may also comprise, by way of further example, one or more "upstream" RF signals sent from a BONU 30 to a respective hub, such as subscriber originated video signals. It should be noted that such RF signals might alternatively be transmitted over the branch network 28 on a more limited basis, e.g., point-to-point or point-to-multipoint transmission.

The "narrowcast" laser 61 preferably outputs a different optical wavelength than respective transmitting broadcast laser 14 at the headend facility 12, so that no interference is caused by the "mid-stream" insertion of the downstream RF signals with the broadcast signals. As such, the output optical signal from laser 61 is preferably not combined with the broadcast signal until after the final EDFA amplifier 26, as the signal may otherwise be filtered during the amplification process, as is described in the above-referenced U.S. Pat. No. 5,457,562, issued to Tremblay et al.

At the optical receiver 32 of each respective BONU 30, the downstream FSK modulated network management signals are separated and demodulated, e.g., in a manner similar to the operation of the aforedescribed FRM 64, and delivered to a remote supervisory unit ("RSU") 63, within the BONU 30. In a similar manner, upstream digital baseband network management signals from the RSU 63 are RF modulated, combined with any other upstream RF signals received from subscribers over the coaxial cable network 36 and optically transmitted by a reverse fiber transmitter ("RFT") 65, (i.e., an optical laser), respectively, over an upstream fiber network 67 back to the respective hub 24. At the hub 24, optical RF signals from a plurality of BONUs are received by a reverse fiber receiver ("RFR") 69, which converts the RF signals from optical to electrical transmission and, by way of one or more frequency filters (not shown), separates the RF modulated (upstream) network management signals from the other RF signals. The upstream network management signals are demodulated and delivered to the respective BSUs 52 at the hub 24.

The remaining upstream RF signals may be separated out by frequency, e.g., for insertion as a narrowcast signal, or for other downstream transmission from the hub 24, or may be combined by an RF combiner 71 to form part of the plurality of independent RF signals 56 to be transmitted upstream over the respective optical modem link 50/48/46.

Thus, a new and useful architecture providing a full duplex optical link for connecting elements of a broadband network, such as a headend video broadcast facility with a network hub location, has been disclosed. While embodiments and applications of this invention have been shown and described, it would be apparent to those skilled in the art that many more modifications and applications are possible without departing from the inventive concepts herein. For example, the duplex optical modem link could be utilized for any type of analog or digital data transport application, and in any type of network, regardless of the signalling protocol, —the aforedescribed CATV broadcast network, including transmission of asynchronous and synchronous digital network management data, RF modulated set-top telemetry signals and analog RF subscriber generated video signals, respectively, being merely exemplary of applications for the present invention.

The scope of the invention, therefore, is not to be restricted except in the spirit of the appended claims.

We claim:

1. A full duplex optical modem, comprising:
   a transmitter configured to transmit a first optical signal having a first wavelength, said first optical signal modulated by a first plurality of independent RF signals including at least a first digitally modulated RF carrier signal;
   a receiver configured to receive a second optical signal having a second wavelength, said second optical signal modulated by a second plurality of independent RF signals including at least a second digitally modulated RF carrier signal;
   a wavelength division multiplexer configured to direct said first optical signal onto, and said second optical signal off of, respectively, an optical transmission medium; and
   a digital channel interface circuit, said interface circuit configured to receive said first digitally modulated RF carrier signal, and further configured to transmit said second digitally modulated RF carrier signal.

2. The optical modem of claim 1, wherein an RF signal in said respective first or second plurality of independent RF signals can have any frequency within a preselected bandwidth.

3. The optical modem of claim 1, said optical transmission medium comprising a single fiber.

4. The optical modem of claim 1, said first and second digitally modulated RF carrier signals comprising network management data for a broadband access network.

5. The optical modem of claim 1, said first plurality of independent RF signals including set-top polling information transmitted from a centralized controller to one or more subscribers of a CATV broadcast network.

6. The optical modem of claim 1, said second plurality of independent RF signals including set-top telemetry data transmitted from one or more subscribers of a CATV broadcast network to a centralized controller.

7. The optical modem of claim 1, said first digitally modulated RF carrier signal comprising an aggregate digital data signal.

8. The optical modem of claim 7, said aggregate digital data signal comprising a plurality of digital data signals.

9. A headend broadcast facility in a CATV broadcast distribution network, comprising:

a system administrative module; and an optical modem, including means for transmitting a first optical signal having a first wavelength, means for receiving a second optical signal having a second wavelength, a wavelength division multiplexer configured to direct said first optical signal onto, and said second optical signal off of, respectively, a fiber link, and a digital channel interface circuit configured to transmit and receive, respectively, digital baseband data.

10. The headend broadcast facility of claim 9, wherein said digital baseband data is converted to and from, respectively, first and second digitally modulated RF carrier signals, and said first and said second digitally modulated RF carrier signals comprise aggregate digital data signals, wherein said aggregate digital data signals each comprise a plurality of time division multiplexed network management data signals.

11. The headend broadcast facility of claim 10, said interface circuit sending and receiving said network management data signals to and from, respectively, said system administrative module.

12. The headend broadcast facility of claim 10, said second digitally modulated RF carrier signal serving as a signal amplitude reference voltage.

13. A headend broadcast facility, comprising:

means for receiving a digital signal;

means for modulating said digital signal with an RF carrier signal;

means for receiving an independent RF signal;

means for modulating said RF-modulated digital signal and said independent RF signal with a first optical signal to thereby generate a first optical signal having a first wavelength;

means for transmitting said first optical signal;

means for receiving a second optical signal having a second wavelength; and means for directing said first optical signal onto, and said second optical signal off of, respectively, an optical transmission medium.

14. The headend broadcast facility of claim 13, wherein said second optical signal is modulated by a second independent RF signal and a second RF-modulated digital signal, and further comprising:

means for converting said second optical signal to a combined RF signal;

means for recovering said second independent RF signal from said combined RF signals; and means for recovering said second RF-modulated digital signal from said combined RF signal.

* * * * *